(12) United States Patent
Jeon et al.

(10) Patent No.: US 11,336,444 B2
(45) Date of Patent: May 17, 2022

(54) HARDWARE SECURITY MODULE FOR VERIFYING EXECUTABLE CODE, DEVICE HAVING HARDWARE SECURITY MODULE, AND METHOD OF OPERATING DEVICE

(71) Applicant: ELECTRONICS AND TELECOMMUNICATIONS RESEARCH INSTITUTE, Daejeon (KR)

(72) Inventors: Yong-Sung Jeon, Daejeon (KR); You-Sung Kang, Daejeon (KR); Byoung-Koo Kim, Daejeon (KR); Sang-Jae Lee, Daejeon (KR); Seung-Kwang Lee, Daejeon (KR); Doo-Ho Choi, Cheonan (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/940,146

(22) Filed: Jul. 27, 2020

(65) Prior Publication Data

US 2021/0058249 A1 Feb. 25, 2021

(30) Foreign Application Priority Data

Aug. 21, 2019 (KR) .................. 10-2019-0102287

(51) Int. Cl.
*H04L 9/08* (2006.01)
*H04L 9/06* (2006.01)

(52) U.S. Cl.
CPC .......... *H04L 9/0877* (2013.01); *H04L 9/0625* (2013.01); *H04L 9/0643* (2013.01); *H04L 9/0869* (2013.01)

(58) Field of Classification Search
CPC ... H04L 9/0877; H04L 9/0625; H04L 9/0643; H04L 9/0869; H04L 9/3236; H04L 9/0897; G06F 21/52; G06F 21/57
USPC ........................................................ 713/189
See application file for complete search history.

(56) References Cited

U.S. PATENT DOCUMENTS

| 9,239,934 | B2 | 1/2016 | Ju et al. | |
| 9,904,806 | B2* | 2/2018 | Ju | H04L 63/0823 |
| 2006/0161761 | A1* | 7/2006 | Schwartz | G06F 21/52 |
| | | | | 711/216 |

(Continued)

FOREIGN PATENT DOCUMENTS

| CN | 108399339 A | 8/2018 |
| KR | 101325096 B1 | 11/2013 |
| KR | 1020150072061 A | 6/2015 |

*Primary Examiner* — Sanchit K Sarker

(57) ABSTRACT

Disclosed herein are a hardware security module, a device having the hardware security module, and a method for operating the device. The method for verifying integrity of executable code in a device includes dividing, by a Micro-Control Unit (MCU), executable code into multiple blocks, generating, by the MCU, hash values corresponding to the blocks resulting from the division, storing, by a Hardware Security Module (HSM), the generated hash values, calculating, by the MCU, at least one hash value, among hash values of the multiple blocks when the executable code boots, and comparing, by the HSM, the calculated hash value with a hash value corresponding to the calculated hash value, among the hash values stored in the HSM.

19 Claims, 8 Drawing Sheets

(56) References Cited

U.S. PATENT DOCUMENTS

| | | | | |
|---|---|---|---|---|
| 2013/0103655 A1* | 4/2013 | Fanghaenel | ......... | G06F 16/2272 |
| | | | | 707/693 |
| 2015/0106579 A1* | 4/2015 | Barrus | .................. | G06F 3/0655 |
| | | | | 711/159 |
| 2019/0253256 A1* | 8/2019 | Saab | ..................... | H04L 9/0637 |
| 2019/0258542 A1* | 8/2019 | Chaiken | ................ | G06F 21/572 |
| 2020/0218792 A1* | 7/2020 | Kataria | ................. | G06F 21/602 |

* cited by examiner

| INSTRUCTION | NUMBER OF PIECES OF DATA | DATA | ion No. 10-2015-0072061, Date of Publication: Jun. 29, 2015, Title: Apparatus and Method for Service Security Based on Mobile Trusted Module
HARDWARE SECURITY MODULE FOR VERIFYING EXECUTABLE CODE, DEVICE HAVING HARDWARE SECURITY MODULE, AND METHOD OF OPERATING DEVICE

CROSS REFERENCE TO RELATED APPLICATION

This application claims the benefit of Korean Patent Application No. 10-2019-0102287, filed Aug. 21, 2019, which is hereby incorporated by reference in its entirety into this application.

BACKGROUND OF THE INVENTION

1. Technical Field

The present invention relates to a hardware security module for verifying executable code, a device having the hardware security module, and a method of operating the device.

2. Description of the Related Art

Generally, the time point that is most important from the standpoint of security during the operation process of a device is boot time. During a booting process, the most important thing is to verify the integrity of executable code. Many attackers attempt to modify software when a device is in a powered-off state. For example, an attack to replace a software image present in flash memory with a damaged image is launched. Therefore, when a system boots an image in the flash memory, the system is vulnerable unless whether the image is an authentic image is first checked.

PRIOR ART DOCUMENTS

Patent Documents (Patent Document 1) Korean Patent Application Publication No. 10-2015-0072061, Date of Publication: Jun. 29, 2015, Title: Apparatus and Method for Service Security Based on Mobile Trusted Module (Patent Document 2) Chinese Patent Application Publication No. CN 108399339, Date of Publication: Aug. 14, 2018, Title: Security chip-based trusted startup method.

SUMMARY OF THE INVENTION

Accordingly, the present invention has been made keeping in mind the above problems occurring in the prior art, and an object of the present invention is to provide a device and method for securely verifying executable code without forming a trust chain.

Another object of the present invention is to provide a device and method for improving executable code verification efficiency in a low-specification device.

It should be understood by those skilled in the art that the objects of the present invention are not limited to the above-described objects, and other objects may also be derived from the following descriptions.

In accordance with an aspect of the present invention to accomplish the above objects, there is provided a method for verifying integrity of executable code in a device, including dividing, by a Micro-Control Unit (MCU), executable code into multiple blocks; generating, by the MCU, hash values corresponding to the blocks resulting from the division; storing, by a Hardware Security Module (HSM), the generated hash values; calculating, by the MCU, at least one hash value, among hash values of the multiple blocks when the executable code boots; and comparing, by the HSM, the calculated hash value with a hash value corresponding to the calculated hash value, among the hash values stored in the HSM.

In an embodiment, the blocks resulting from the division may have respectively different sizes.

In an embodiment, generating the hash values may include setting start points or end points, at which hash values are to be calculated, for the blocks resulting from the division to different points.

In an embodiment, generating the hash values may further include adding a first offset value corresponding to each start point or a second offset value corresponding to each end point to a corresponding block of the blocks resulting from the division.

In an embodiment, the method may further include generating, by the HSM, the first offset value corresponding to the start point and the second offset value corresponding to the end point using a random number generator; and storing, by the HSM, the first and second offset values.

In an embodiment, generating the hash values may further include, in order to generate a hash value of at least one of the blocks resulting from the division, setting a block range to a range from a point, obtained by subtracting the first offset value from a start point of the at least one block, to a point, obtained by adding the second offset value to an end point of the at least one block.

In an embodiment, a block range of a first block, among the blocks resulting from the division, may range from a start point of the first block to a point obtained by adding the second offset value to an end point of the first block.

In an embodiment, a block range of a last block, among the multiple blocks resulting from the division, may range from a point, obtained by subtracting the first offset value from a start point of the last block, to an end point of the last block.

In an embodiment, the generated hash values may be stored in the HSM when the device is manufactured.

In an embodiment, the HSM may verify integrity of all blocks resulting from the division.

In an embodiment, the HSM may verify integrity of any one of the blocks resulting from the division.

In an embodiment, the method may further include randomly generating a block number corresponding to the one block.

In an embodiment, an operation of verifying the integrity of the one block may be performed when the MCU invokes a security function provided by the HSM.

In accordance with another aspect of the present invention to accomplish the above objects, there is provided a hardware security module for verifying integrity of executable code, including at least one processor; and a memory for storing at least one instruction that is executed by the at least one processor, wherein the at least one instruction is executed by the at least one processor so as to: when a device is manufactured, receive hash values corresponding to executable code divided into multiple blocks from a Micro-Control Unit (MCU), store the hash values corresponding to the divided executable code, receive at least one hash value, among hash values of the multiple blocks, from the MCU when the device boots; and compare the at least one hash value with a hash value corresponding to the at least one hash value, among the stored hash values.

In an embodiment, when the device boots, integrity of all of the multiple blocks may be verified.

In an embodiment, when a security function invocation is received from the MCU, integrity of any one of the multiple blocks may be verified.

In an embodiment, the hardware security module may further include a random number generator for generating a block number corresponding to any one of the multiple blocks.

In an embodiment, block ranges for respectively verifying integrity of the multiple blocks may be set differently depending on devices.

In accordance with a further aspect of the present invention to accomplish the above objects, there is provided a device for verifying integrity of executable code, including a micro-control unit (MCU) for dividing the executable code into multiple blocks when the device is manufactured and generating hash values corresponding to the multiple blocks resulting from the division; and a hardware security module for storing the generated hash values when the device is manufactured, receiving at least one hash value, among hash values of the multiple blocks from the MCU when the executable code boots, comparing the received hash value with a hash value corresponding to the received hash value, among the stored hash values, and verifying integrity of the executable code based on a result of the comparison.

In an embodiment, the block ranges of the multiple blocks may be set differently for respective devices using at least one offset value generated by a random number generator of the hardware security module.

BRIEF DESCRIPTION OF THE DRAWINGS

The attached drawings are provided to help better understanding of the present embodiment, and embodiments are provided together with the detailed description thereof. However, the technical features of the present embodiments are not limited to specific drawings, and features disclosed in respective drawings may be combined with each other to configure new embodiments.

DESCRIPTION OF THE PREFERRED EMBODIMENTS

Figure 1:
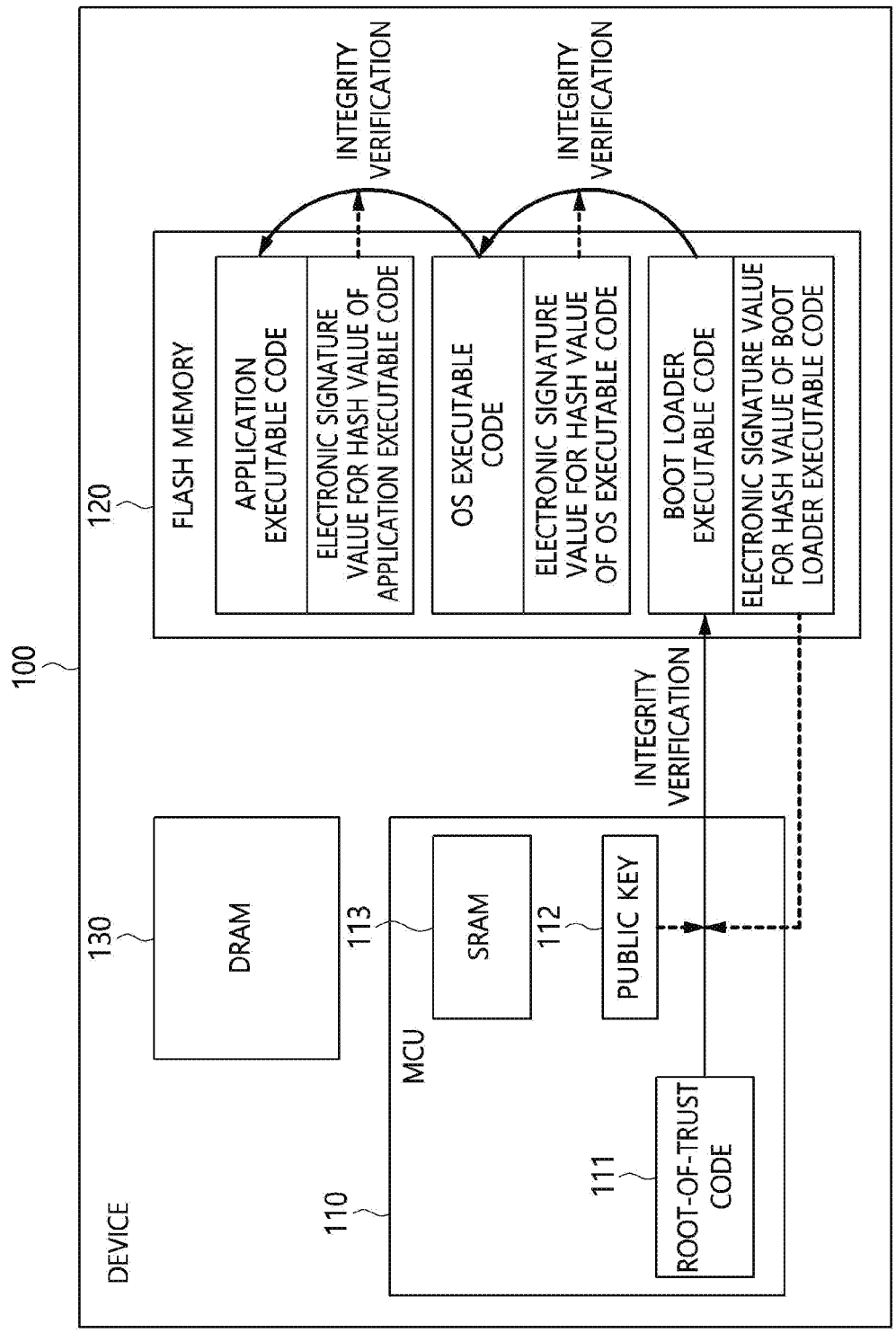
FIG. 1 is a diagram exemplarily illustrating a method for verifying the integrity of executable code in a typical device.

The present invention will be described in detail below with reference to the accompanying drawings so that those having ordinary knowledge in the technical field to which the present invention pertains can easily practice the present invention.

Because the present invention may be variously changed and may have various embodiments, specific embodiments will be described in detail below with reference to the accompanying drawings. However, it should be understood that the embodiments are not intended to limit the present invention to specific disclosure forms and that they include all changes, equivalents or modifications included in the spirit and scope of the present invention. It will be understood that, although the terms "first," "second," etc. may be used herein to describe various elements, these elements are not intended to be limited by these terms. These terms are only used to distinguish one element from another element. For example, a first element could be referred to as a second element without departing from the scope of rights of the present invention. Similarly, a second element could also be referred to as a first element. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Also, the terms used herein are used merely to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Generally, a high-specification device (e.g., a smart terminal such as a smart phone) performs a booting process by forming a chain of trust. That is, a trustworthy component may primarily start to boot, and a procedure for authenticating the trustworthy component is performed before subsequent software is executed.

FIG. 1 is a diagram exemplarily illustrating a method for verifying the integrity of executable code of a typical device 100. Referring to FIG. 1, when the power of the device 100 is turned on, the main micro-control unit (MCU) 110 of the device 100 starts running root-of-trust code at a trustworthy location. As memory which runs the root-of-trust code, Read-Only Memory (ROM) 111 in the main MCU 110 is typically used. The ROM 111 in the main MCU 110 is the unique component of the system that can be neither simply modified nor replaced through reprogramming attacks.

First, in order to form a chain of trust, code that runs on the ROM 111 verifies the integrity of the executable code of a boot loader stored in external flash memory 120.

Integrity verification methods are described as follows. When the executable code of the boot loader is stored in the flash memory 120, an electronic signature value (certificate) for a hash value of the executable code of the boot loader is stored together with the executable code in the flash memory 120, with the electronic signature value being affixed to the executable code. This signature value is decoded using a public key stored in One-Time Programmable (OTP) memory 112 in the main MCU 110, and thus a hash value is calculated. The calculated hash value is compared with the hash value of the executable code of the current boot loader. When the hash values are found to be identical to each other as a result of the comparison, the integrity of the executable code of the current boot loader is not damaged, and thus the boot loader may be moved to and executed in Static Random Access memory (SRAM) 113 in the main MCU 110.

Similarly, the boot loader verifies the integrity of the executable code of an Operating System (OS) stored in the external flash memory 120 using the same method. Thereafter, when the integrity is not damaged, the OS is loaded into Dynamic Random Access Memory (DRAM) 130 and is then run.

Using the same method, the integrity of an application is verified and then the application is executed. In this way, there is a method for sequentially verifying the integrity of executable code to be subsequently run using the electronic signature value (certificate) stored together with the executable code.

As described above, there is a method of using an electronic signature value (certificate) stored together with the executable code in order to verify the integrity of the executable code to be sequentially run.

Further, in addition to the above-described method, there is a method using a Hardware Security Module (HSM) so as to securely store the hash value of executable code used to verify the integrity of executable code. That is, this is intended to store the hash value of undamaged executable code having integrity in a hardware security module that is capable of preventing physical hacking.

Figure 2:
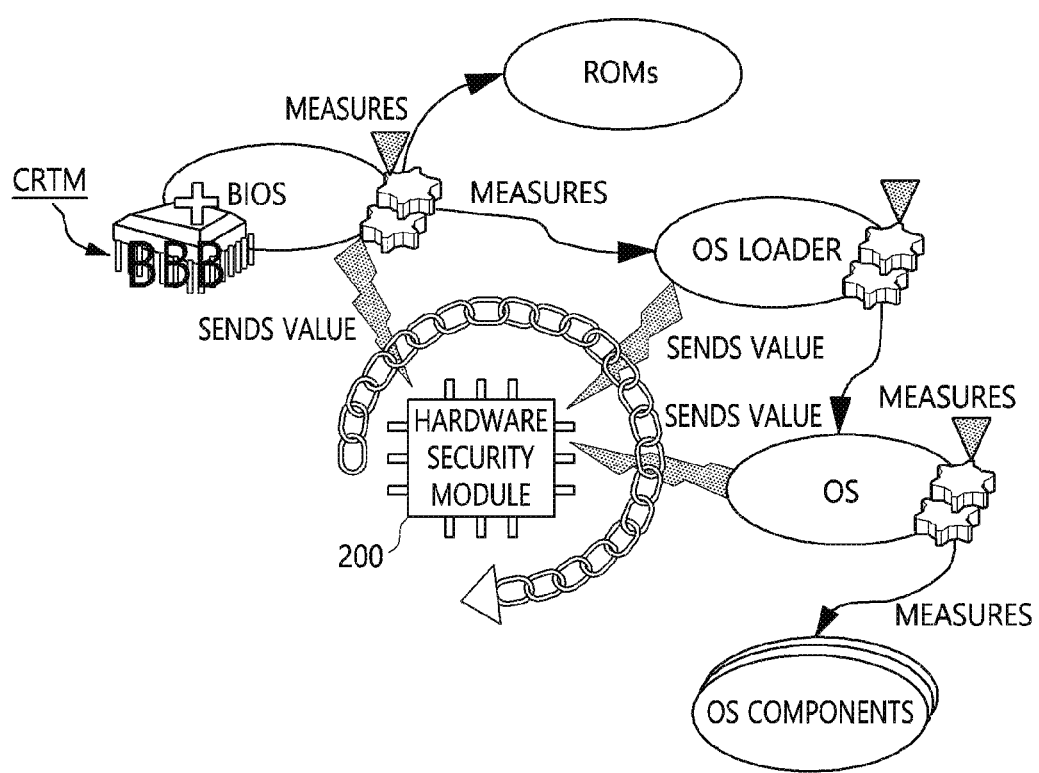
FIG. 2 is a diagram exemplarily illustrating a method for verifying the integrity of executable code using a typical hardware security module.

FIG. 2 is a diagram exemplarily illustrating a method for verifying the integrity of executable code using a typical hardware security module 200. Referring to FIG. 2, the hash value of an OS loader, the hash value of an OS, and the hash values of OS components are already securely stored in the hardware security module 200.

During a booting process, the integrity of the executable code is sequentially verified. That is, when the power of a device is turned on, the executable code of ROM runs, and the ROM calculates the hash value of the executable code of a current OS loader so as to verify the integrity of the executable code of the OS Loader to be subsequently run, and sends the calculated hash value to the hardware security module 200.

The hardware security module 200 compares the received hash value with the hash value of the executable code of the OS loader stored in the hardware security module 200 and sends the result of the comparison. When the result indicates that the hash values are identical to each other, the ROM may load the executable code of the OS loader into RAM and then run the executable code.

Similar to this method, after the OS loader has verified the integrity of the OS using the hardware security module 200, it loads the executable code of the OS into the RAM and then runs the executable code. Also, after the OS has verified the integrity of OS components using the hardware security module 200, it loads the executable code of the OS components into the RAM, and then runs the executable code The above-described methods for verifying the integrity of executable code are configured such that the booting of the device is basically initiated in the ROM and such that the integrity of executable code to be subsequently run is sequentially verified. Since the ROM is memory in which data stored therein cannot be modified, methods that start with the ROM and verify the integrity of subsequent code may be considered to be secure. However, the above-described methods for verifying the integrity of executable code are mainly used in high-specification devices.

The device that is the target of the method for verifying the integrity of executable code according to the present invention is a low-specification device. The low-specification device does not form a chain of trust, which starts initial booting with ROM and verifies the integrity of executable code in stages. When booting is performed using ROM, the ROM is used merely to program the executable code into the flash memory. In other words, in the case of low-specification devices, after the executable code of the user has been programmed into the flash memory, a booting process and the executable code of the user may immediately run using the flash memory. Therefore, the above-described chain of trust is not formed. In other words, the device that is the target of the present invention stores the executable code of the OS and the application in the flash memory and immediately runs the executable code in the flash memory, rather than moving the executable code to the RAM and running the same thereon. Generally, in the case of a low-specification device, the flash memory in which the executable code is stored and run is located in the main MCU of the device. Most low-specification Internet-of-Things (IoT) devices have such a scheme for running executable code. Therefore, the above-described methods for verifying the integrity of executable code through the formation of a chain of trust cannot be applied to low-specification devices.

In order to verify the integrity of executable code running on the flash memory, a program for verifying integrity must also be present in the executable code that runs on the flash memory. That is, the executable code that runs on the flash memory must verify the integrity thereof by itself. In order to allow the executable code to run on the flash memory and verify the integrity thereof by itself in this way, the most important thing is to securely store the integrity value of the executable code (the hash value of undamaged executable code).

Among existing methods, the method for prestoring the integrity value of executable code (i.e., the hash value of undamaged executable code) in a remote server may be occasionally used. In this case, when the device boots, the executable code calculates the hash value of the current executable code and transmits the hash value to a server over a network. The server having received this hash value performs a procedure for comparing the received hash value with the integrity value of the executable code that is prestored. When the server is used as a subject that verifies integrity, the hash value is transferred over the network, and a network delay time occurs. Also, there occurs the burden of encrypting the hash value of the current executable code and transmitting the encrypted hash value to maintain security on the network. Due to this problem, the verification of integrity using the server in the low-specification device has low efficiency.

In order to solve the problems with the above-described methods, a device and method for verifying the integrity of executable code according to embodiments of the present invention may use a hardware security module (security chip) enabling the prevention of physical hacking in order to securely store the integrity value of executable code (the hash value of undamaged executable code) in a low-specification device which stores and runs executable code in flash memory and must verify the integrity of the executable code by itself.

The device and method for verifying the integrity of executable code according to embodiments of the present invention may prestore the integrity value of executable code in the hardware security module, and may perform a process in which, when the hash value of the current executable code is calculated and transmitted to the hardware security module during a procedure for running the executable code, the hardware security module compares the hash value of the current executable code with the prestored integrity value of the executable code.

A typical method for verifying the integrity of executable code uses a method of calculating the hash value of all of the executable code. However, this method is vulnerable to attacks which can avoid the verification of integrity of executable code. That is, since devices having the same function have the same executable code, the integrity values of executable code (i.e., hash value of undamaged executable code) stored in hardware security modules may also be identical to each other. Therefore, the executable code may be modified such that the executable code is damaged and the original hash value is transferred to the corresponding hardware security module. That is, this method may be equally applied to all devices which use the same executable code.

However, the device and method for verifying the integrity of executable code according to embodiments of the present invention divide the executable code into predetermined portions and differently set start points and end points, which hash values are to be calculated, with respect to the portions resulting from division, without calculating hash values for all of the executable code at one time, and thus respective devices may have different integrity values for the executable code.

When this method is used, even if devices use the same executable code, the integrity values of executable code stored in the hardware security modules (the hash values of undamaged executable code) may differ from each other for respective devices. Therefore, in order to attempt to launch an attack to damage the executable code of the device and deliver the original hash value to the hardware security module, it is required to expend effort to analyze the integrity values of executable code stored in hardware security modules for respective devices. However, it is unfeasible to individually analyze all devices that use the same executable code. Therefore, when the method for verifying the integrity of executable code according to the embodiment of the present invention is used, it is possible to prevent the executable code of the device from being damaged in a manner that enables a large number of devices to be maliciously used.

Figure 3:
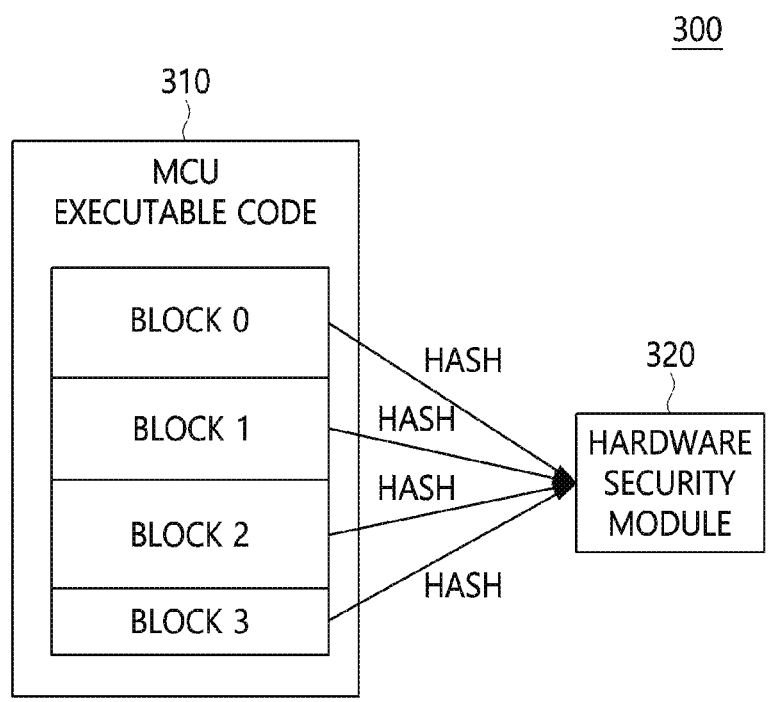
FIG. 3 is a diagram exemplarily illustrating a device according to an embodiment of the present invention.

FIG. 3 is a diagram exemplarily illustrating a device 300 according to an embodiment of the present invention. Referring to FIG. 3, the device 300 may include a Micro-Control Unit (or microcontroller unit, MCU) 310 and a hardware security module 320. The device 300 may verify the integrity of executable code using the hardware security module 320.

In an embodiment, the hardware security module 320 may include at least one processor and memory for storing at least one instruction that is executed by the at least one processor. Here, the at least one instruction may be executed by the at least one processor so that, when the device is manufactured, hash values corresponding to executable code divided into multiple blocks are received from the MCU 310, the hash values corresponding to the divided executable code are stored, and at least one hash value, among hash values of the multiple blocks, is received from the MCU 310 when the device 300 boots, and so that the received at least one hash value is compared with a hash value, corresponding to the received at least one hash value, among the stored hash values.

In an embodiment, the executable code may be divided into multiple blocks, and hash values of respective blocks may be stored in the hardware security module 320. In an embodiment, the verification of integrity of the executable code may be performed on a per-block basis.

Also, when the executable code of the device 300 is divided, the executable code may be divided into blocks of different sizes rather than being simply divided into blocks of an equal size. That is, respective devices may be designated to have blocks of different sizes.

Figure 4:
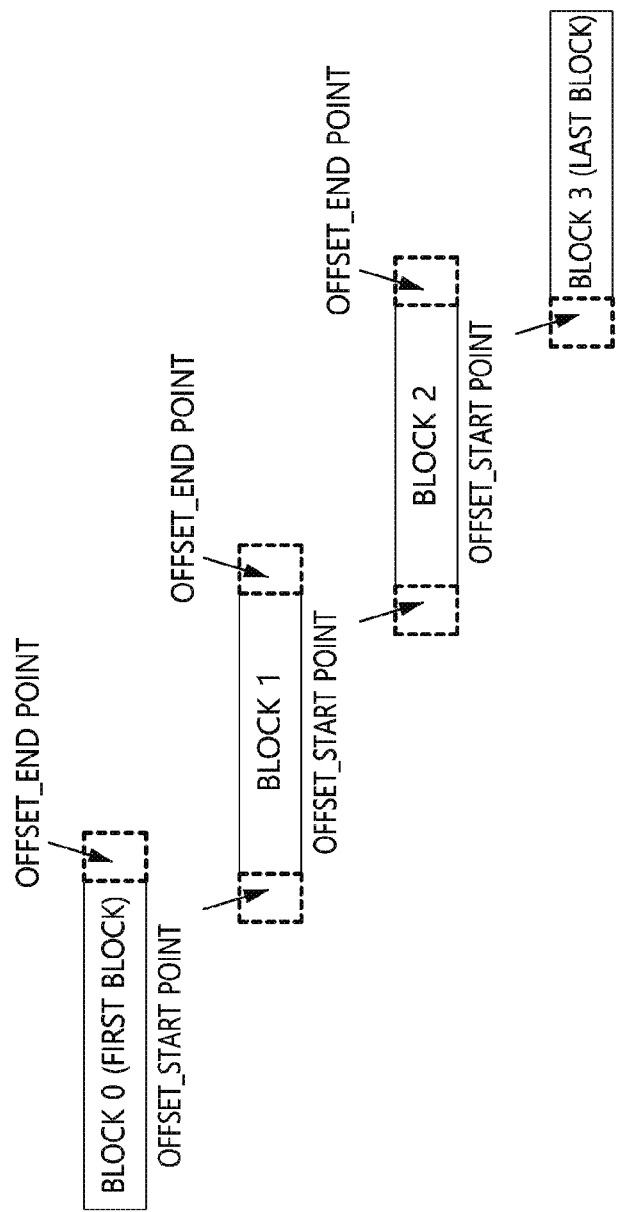
FIG. 4 is a diagram exemplarily illustrating a method for dividing executable code into blocks to verify the integrity of the executable code according to an embodiment of the present invention.

FIG. 4 is a diagram exemplarily illustrating a method for dividing executable code into blocks to verify the integrity of the executable code according to an embodiment of the present invention. Referring to FIG. 4, offset values may be set for a start point and end point of each block.

In an embodiment, when a device (see 300 of FIG. 3) is initially booted after being manufactured, the hardware security module 320 may set offset values for respective blocks using a random number generator, and may store the offset values in the hardware security module 320.

In FIG. 4, it is assumed that, for convenience of description, executable code is divided into four blocks. Block 0 (first block) has an end point offset value (second offset value), each of block 1 and block 2 has a start point offset value (first offset value) and an end point offset value (second offset value), and block 3 (last block) has a start point offset value (first offset value).

In an embodiment, the range of blocks for calculating the integrity value may be the range in which such offset values are added. That is, one block range in which the integrity value is calculated may be the range from a point corresponding to (block start point−OFFSET_START POINT) to a point corresponding to (block end point+OFFSET_END POINT). When this method is used, respective devices may set different offset values. Also, the ranges of blocks for calculating the integrity value may change. Therefore, for all devices, the integrity values of executable code may be set to different values.

For example, as illustrated in FIG. 4, the executable code may be divided into four blocks. The start point offset value OFFSET_START POINT and the end point offset value OFFSET_END POINT may be set to values ranging from 0 to 255 bytes (block 0 has only an end point offset value, and block 3 has only a start point offset value).

Here, the number of cases for the hash value required for the verification of integrity may be 256*256*256*256*256*256=281 trillion. Due thereto, when the integrity of executable code of the device 300 is verified, even if only one example presented in the present invention is applied, devices 300 which run the same executable code may actually have different integrity values.

Therefore, when this method for verifying the integrity of executable code is used, an attack to avoid the verification of integrity in such a way as to notify the hardware security module 320 of the original hash value even if the executable code is damaged may be prevented.

Meanwhile, the process for verifying the integrity of the executable code may be performed, as described in detail below. First, a procedure for storing the integrity value of executable code (hash value of undamaged executable code), running on a main MCU 310, in the hardware security module 320 may be performed at the moment at which the executable code of the main MCU 310 initially boots in the device 300. Since the executable code of the main MCU 310 initially boots, this procedure may be regarded as the procedure for manufacturing the device 300. The executable code is considered to be in a state having integrity, without being damaged.

Figures 5, 6:
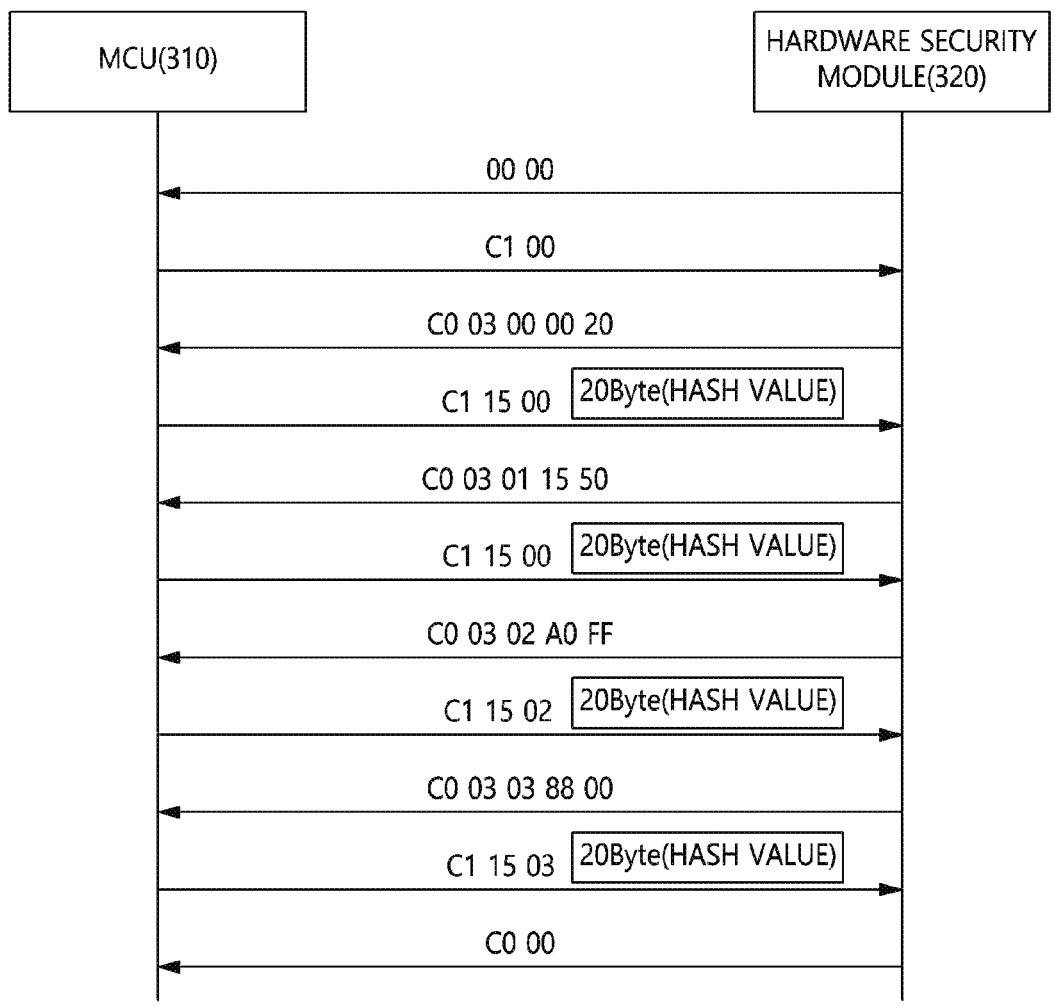
FIG. 5 is a diagram exemplarily illustrating a process in which the device stores an integrity value in a hardware security module according to an embodiment of the present invention.
FIG. 6 is a diagram exemplarily illustrating the basic format of instructions between a main MCU and the hardware security module according to an embodiment of the present invention.

FIG. 5 is a diagram exemplarily illustrating a process in which the device stores an integrity value in the hardware security module 320 according to an embodiment of the present invention. In FIG. 5, the flow of instructions, executed when the executable code of the main MCU 310 is divided into four blocks and then hash values are stored, is depicted.

First, the basic format of instructions exchanged between the hardware security module 320 and the main MCU 310 will be described below. A first byte defines an instruction corresponding to a function provided by the hardware security module 320. A second byte defines the number of pieces of data. For example, the case where the second byte is '2' means that data is present in a third byte and a fourth byte. The case where the second byte is '0' means that data is not present and the instruction is terminated at the second byte.

FIG. 6 is a diagram exemplarily illustrating the basic format of instructions between the main MCU 310 and the hardware security module 320 according to an embodiment of the present invention. Referring to FIG. 6, each instruction may be composed of an instruction field, a number-of-pieces-of-data field, and a data field. Hereinafter, the instruction illustrated in FIG. 5 will be described in detail.

'00 00'

The hardware security module 320 notifies the main MCU 310 that the integrity value of executable code of the main MCU 310 is not stored in the internal memory of the hardware security module 320.

'C1 00'

The main MCU 310 requests the hardware security module 320 to transmit information required for calculation of the integrity value.

'C0 03 00 00 20'

First byte 'C0': this means that the calculation of hash values is requested.

Second byte '03': this indicates that the number of pieces of consecutive data is 3.

Third byte '00': this indicates that a block number for which the calculation of a hash value is to be started is '0'.

Fourth byte '00': this means that the offset of a start point, at which the calculation of the hash value is to be started, is 0 bytes, that is, start point offset=0 bytes. Block 0 always has start point offset=0 bytes.

Fifth byte '20': this means that the offset of an end point at which the calculation of the hash value is to be ended is 0×20 bytes, that is, end point offset=0×20 bytes.

In summary, the calculation of the hash value is performed such that the hash value is calculated within a range from the start point of block number '0', that is, the start point of the executable code, to a point corresponding to (end point of block number '0'+0×20).

'C1 15 00 20 Bytes (Hash Value)'

First byte 'C1': this means that the calculated hash value is transmitted.

Third byte '00': this means that a block number for which the hash value is calculated is '0'.

Fourth byte '23rd byte': this indicates a hash value calculated for the corresponding block.

'C0 03 01 15 50'

First byte 'C0': this indicates that the calculation of a hash value is requested.

Third byte '01': this means that a block number for which the calculation of a hash value is to be started is '1'.

Fourth byte '15': this means that the offset of a start point, at which the calculation of a hash value is to be started, is 0×15 bytes, that is, start point offset=0×15 bytes.

Fifth byte '50': this indicates that the offset of an end point, at which the calculation of a hash value is to be ended, is 0×50 bytes, that is, end point offset=0×50 bytes.

In summary, the calculation of the hash value is performed such that the hash value is calculated within a range from a point corresponding to (start point of block number '1'−0×15 bytes) to a point corresponding to (end point of block number '1'+0×50).

'C1 15 01 20 Bytes (Hash Value)'

First byte 'C1': this means that the calculated hash value is transmitted.

Third byte '01': this means that a block number for which the hash value is calculated is '1'.

Fourth byte '23rd byte': this indicates the hash value calculated for the corresponding block.

'C0 03 02 A0 FF'

First byte 'C0': this indicates that the calculation of a hash value is requested.

Third byte '02': this means that a block number for which the calculation of a hash value is to be started is '2'.

Fourth byte 'A0': this means that the offset of a start point, at which the calculation of the hash value is to be started, is 0×A0 bytes, that is, start point offset=0×A0 bytes.

Fifth byte 'FF': this means that the offset of an end point at which the calculation of the hash value is to be ended is 0×FF bytes, that is, end point offset=0×FF bytes.

In summary, the calculation of the hash value is performed such that the hash value is calculated within a range from a point corresponding to (start point of block number '2'−0×A0 bytes) to a point corresponding to (end point of block number '2'+0×FF).

'C1 15 02 20 Bytes (Hash Value)'

First byte 'C1': this means that a calculated hash value is transmitted.

Third byte '00': this means that a block number for which the hash value is calculated is '0×02'.

Fourth byte '23rd byte': this indicates the hash value calculated for the corresponding block.

'C0 03 03 88 00'

First byte 'C0': this indicates that the calculation of a hash value is requested.

Third byte '03': this means that a block number for which the calculation of a hash value is to be started is '3'.

Fourth byte '88': this means that the offset at a start point at which the calculation of a hash value is to be started is 0×88 bytes, that is, start point offset=0×88 bytes.

Fifth byte '00': this means that the offset of an end point at which the calculation of the hash value is to be ended is 0×0 bytes, that is, end point offset=0×0 bytes. The last block must always satisfy end point offset=0 bytes.

In summary, the calculation of the hash value is performed such that the hash value is calculated within a range from a point corresponding to (start point of block number '3'−0×88 bytes) to the end point of block number '3', that is, the last point of the code.

'C1 15 03 20 Bytes (Hash Value)'

First byte 'C1': this means that a calculated hash value is transmitted.

Third byte '03': this means that a block number for which the hash value is calculated is '0×03'.

Fourth byte '23rd byte': this indicates the hash value calculated for the corresponding block.

'C0 00'

This means that the hardware security module notifies the main MCU that storage of the hash value has been completed.

Next, the process for verifying the integrity of all blocks (all of the code) of the executable code of the main MCU may be performed.

Figure 7:
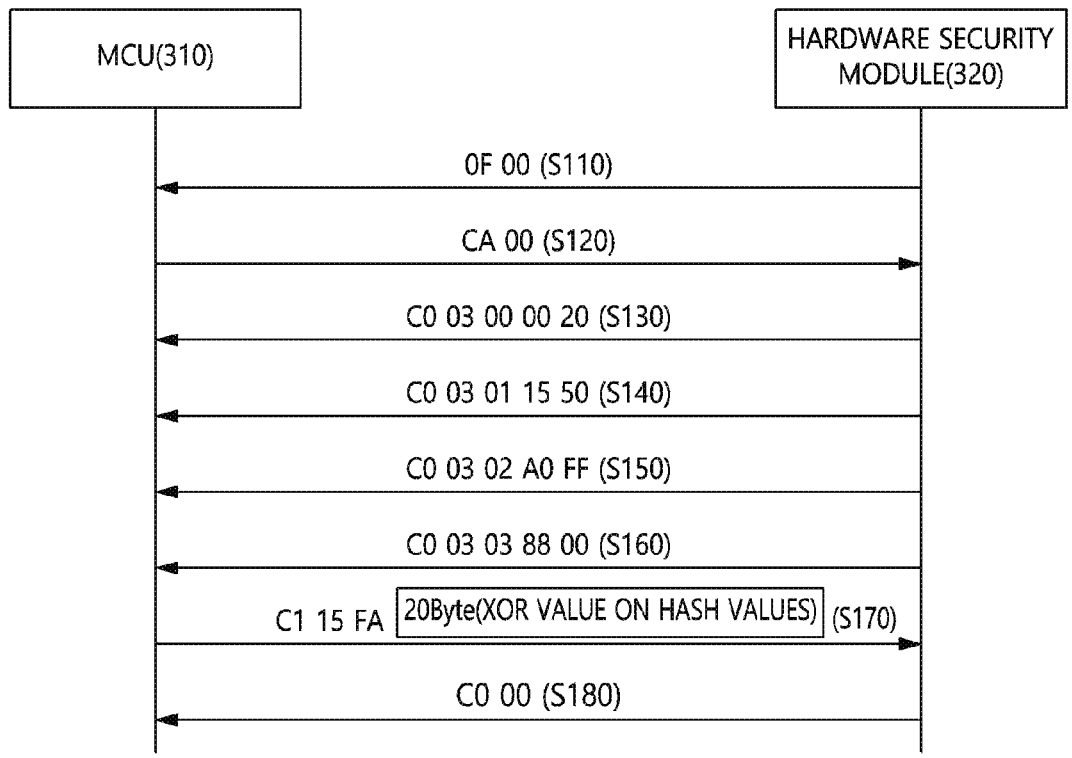
FIG. 7 is a flowchart exemplarily illustrating the operation of verifying the integrity of all blocks (all of code) of the executable code of the main MCU according to an embodiment of the present invention.

FIG. 7 is a flowchart exemplarily illustrating a method for verifying the integrity of all blocks (all of code) of the executable code of the main MCU 310 according to an embodiment of the present invention. Referring to FIG. 7, the operation of verifying the integrity of executable code is performed as follows.

The verification of integrity of all of the code may be generally performed during a process of booting the main MCU 310. That is, when booting starts, the hardware security module 320 notifies the main MCU 310 that the integrity value of executable code of the main MCU 310 is stored in the hardware security module 320 at step S110. The instruction '0F 00' transmitted at this time indicates that the hardware security module 320 stores the integrity value of the executable code of the main MCU 310 in the internal memory thereof The main MCU 310 requests information required for the verification of integrity of executable code from the hardware security module 320 at step S120. Here, the instruction 'CA 00' transmitted at this time indicates that the main MCU 310 commands the hardware security module 320 to transmit the information required for the verification of integrity of all of the executable code.

The hardware security module 320 sequentially transmits block numbers and offsets of the executable code of the main MCU 310, for which integrity verification is to be performed, at steps S130, S140, S150, and S160.

In the instruction 'C0 03 00 00 20' transmitted at step S130, the first byte 'C0' indicates that the calculation of a hash value is requested, the second byte '03' indicates that the number of pieces of consecutive data is 3, and the third byte '00' means that a block number for which the calculation of a hash value is to be started is '0×00'. The fourth byte '00' means that the offset of a start point at which the calculation of a hash value is to be started is 0×00 bytes (start point offset=0×00 bytes), wherein, for block 0, start point offset=0 bytes must always be satisfied. The fifth byte '20' means that the offset of an end point at which the calculation of a hash value is to be ended is 0×20 bytes (end point offset=0×20 bytes). In summary, the calculation of the hash value is performed such that the hash value is calculated within a range from the start point of block number '0', that is, the start point of the code, to a point corresponding to (end point of block number '0'+0×20).

In the instruction 'C0 03 01 15 50' transmitted at step S140, the first byte 'C0' indicates that the calculation of a hash value is requested, the third byte '01' indicates that a block number for which the calculation of a hash value is to be started is '0×01', the fourth byte '15' means that the offset value of a start point at which calculation of a hash value is to be started is 0×15 bytes (start point offset=0×15 bytes), and the fifth byte '50' means that the offset of an end point at which the calculation of a hash value is to be ended is 0×50 bytes (end point offset=0×50 bytes). In summary, the calculation of the hash value is performed such that the hash value is calculated within a range from a point corresponding to (start point of block number '1'−0×15 bytes) to a point corresponding to (end point of block number '1'+0×50 bytes).

In the instruction 'C0 03 02 A0 FF' transmitted at S150, the first byte 'C0' means that the calculation of a hash value is requested, the third byte '02' means that a block number for which the calculation of a hash value is to be started is '0×02', the fourth byte 'A0' means that the offset of a start point at which the calculation of a hash value is to be started is 0×A0 bytes (start point offset=0×A0 bytes), and the fifth byte 'FF' means that the offset of an end point at which the calculation of a hash value is to be ended is 0×FF bytes (end point offset=0×FF bytes). In summary, the calculation of the hash value is performed such that the hash value is calculated within a range from a point corresponding to (start point of block number '2'−0×A0 bytes) to a point corresponding to (end point of block number '2'+0×FF bytes).

In the instruction 'C0 03 03 88 00' transmitted at S160, the first byte 'C0' means that the calculation of a hash value is requested, the third byte '02' means that a block number for which the calculation of a hash value is to be started is '0×03', the fourth byte 'A0' means that the offset of a start point, at which the calculation of a hash value is to be started, is 0×88 bytes (start point offset=0×88 bytes), and the fifth byte 'FF' means that the offset of an end point, at which the calculation of a hash value is to be ended, is 0×0 bytes (end point offset=0×0 bytes), wherein, for the last block, end point offset=0 bytes must always be satisfied. In summary, the calculation of the hash value is performed such that the hash value is calculated within a range from a point corresponding to (start point of block number '3'−0×88 bytes) to the end point of block number '3', that is, the last point of the code.

The main MCU 310 sequentially calculates the hash values of the executable code corresponding to block numbers transmitted from the hardware security module 320, calculates the final integrity value by performing XOR operations on all of the hash values calculated on a per-block basis, and then transmits the calculated integrity value to the hardware security module 320 at step S170. In the instruction 'C2 15 FA 20 bytes (hash value)' transmitted at step S170, the first byte 'C2' means a command instructing a requested integrity value (hash value) to be calculated and transmitted, the third byte 'FA' means that the range in which hash values are calculated covers all blocks (all of the executable code), and the fourth byte to the 23rd byte indicate values obtained by performing XOR operations on the hash values of respective blocks.

The hardware security module 320 compares the integrity value transmitted from the main MCU 310 with the integrity values stored in the hardware security module 320 and notifies the main MCU 310 that the verification of integrity has succeeded when the integrity values are found to be identical to each other as a result of the comparison at step S180.

The instruction 'C0 00' transmitted at step S180 means that the hardware security module 320 notifies the main MCU 310 that the verification of integrity (the received integrity value is identical to the integrity value stored in the hardware security module 320) has succeeded.

Meanwhile, the hardware security module 320 may perform security functions (e.g., encryption, signature, key management, etc.) provided therein only when the verification of integrity of the executable code has passed. If the verification of integrity of the executable code has failed, the security functions in the hardware security module 320 cannot be used.

Finally, after booting of the device has been completed, the integrity of executable code of the main MCU 310 may be verified even when the main MCU 310 performs the security functions provided by the hardware security module 320. In this case, in order to minimize a burden on the device 300 attributable to integrity verification, the verification of integrity of one specific block of the executable code of the main MCU 310 is performed. The verification of integrity of one block of the executable code of the main MCU 310 is performed as follows.

Figure 8:
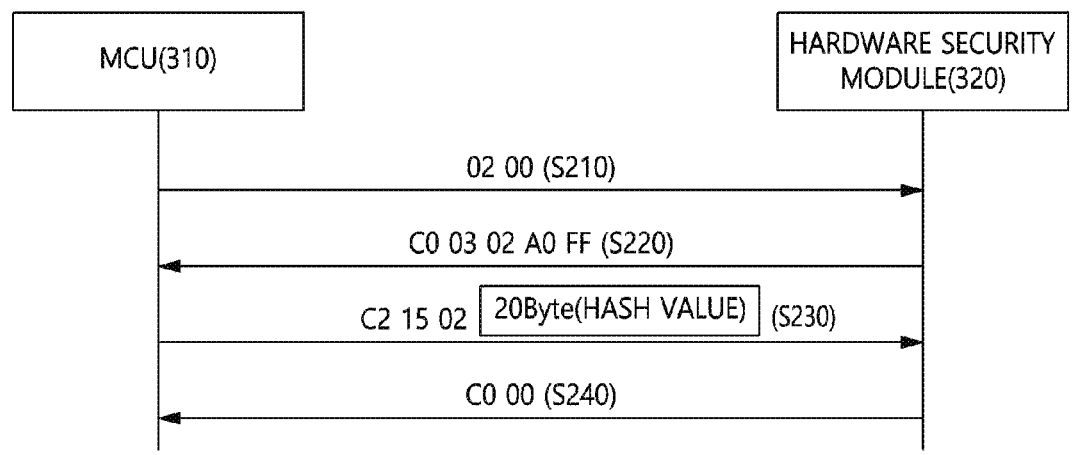
FIG. 8 is a flowchart exemplarily illustrating the operation of verifying the integrity of one block of the executable code of the main MCU according to an embodiment of the present invention.

FIG. 8 is a flowchart exemplarily illustrating the operation of verifying the integrity of one block of the executable code of the main MCU 310 according to an embodiment of the present invention. Referring to FIG. 8, the operation of verifying the integrity of one block of the executable code is performed as follows.

The main MCU 310 requests information required for the verification of integrity of one block of the executable code from the hardware security module 320 at step S210.

For example, the instruction 'C2 00' transmitted at this time means that the main MCU 310 commands the hardware security module 320 to transmit the information required for the verification of integrity of one block of the executable code.

The hardware security module 320 transmits the block number and offset value of the main MCU 310 for which integrity verification is to be performed to the main MCU 310 at step S220. Here, the hardware security module 320 randomly generates the block number.

In the instruction 'C0 03 02 A0 FF' transmitted at this time, the first byte 'C0' means that the calculation of a hash value is requested, the third byte '02' means that a block number for which the calculation of a hash value is to be started is '0×02', the fourth byte 'A0' means that the offset of a start point at which the calculation of a hash value is to be started is 0×A0 bytes (start point offset=0×A0 bytes), and the fifth byte 'FF' means that the offset of an end point at which the calculation of a hash value is to be ended is 0×FF bytes (end point offset=0×FF bytes). In summary, the calculation of the hash value is performed by requesting the main MCU 310 to calculate the hash value within a range from a point corresponding to (start point of block number '2'−0×A0 bytes) to a point corresponding to (end point of block number '2'+0×FF bytes).

The main MCU 310 calculates the hash value of the executable code corresponding to the block number transmitted from the hardware security module 320 and transmits the hash value to the hardware security module 320 at step S230.

For example, in the instruction 'C2 15 02 20 bytes (hash value)' transmitted at this time, the first byte 'C2' means a command instructing the calculation and transmission of a hash value for the requested block, the third byte '02' means that the block number for which a hash value is calculated is '0×02', and the fourth byte to '23rd byte' indicate a hash value calculated for the corresponding block.

The hardware security module 320 compares the received hash value with a hash value stored in the hardware security module 320, and notifies the main MCU 310 that verification of integrity has succeeded when the hash values are found to be identical to each other as a result of the comparison at step S240.

For example, the instruction 'C0 00' transmitted at this time means that the received integrity value is identical to a requested integrity value. That is, the hardware security module 320 notifies the main MCU 310 that verification of integrity has succeeded.

As described above, the verification of integrity of one block of the executable code of the main MCU 310 may be performed during an operating procedure after booting of the device 300 has been completed. Further, the verification of integrity of one block may also be performed whenever the main MCU 310 invokes a security function provided by the hardware security module 320. Furthermore, the verification of integrity of one block of executable code may be performed only for a specific function, among the security functions of the hardware security module 320.

Since the above-described operation scenario is only an embodiment, the present invention is not limited thereto. The performance of functions related to the integrity verification of executable code of the main MCU 310 in the device 300 using the hardware security module 320 may be implemented in various operation scenarios.

Figure 9:
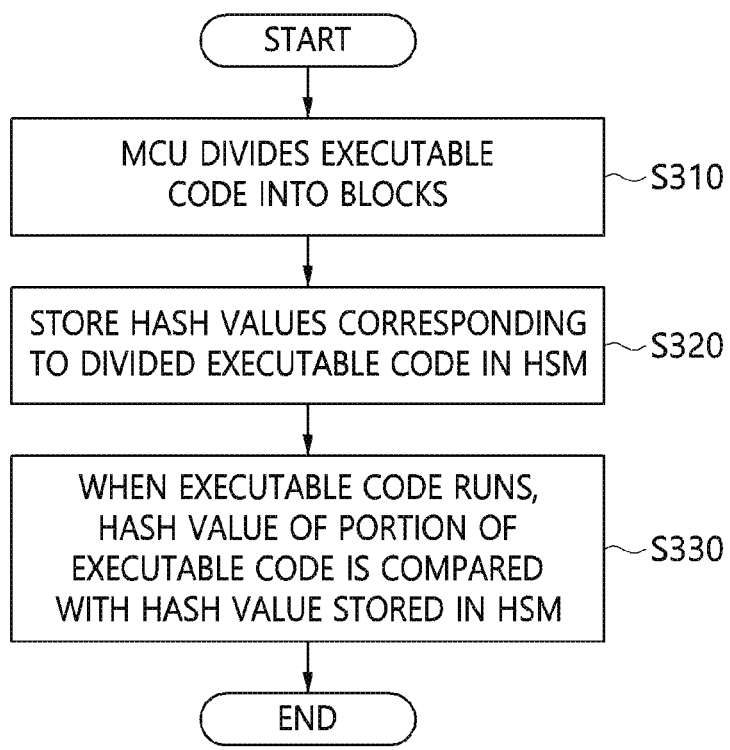
FIG. 9 is a flowchart exemplarily illustrating a method for operating a device for verifying the integrity of executable code according to an embodiment of the present invention.

FIG. 9 is a flowchart exemplarily illustrating a method for operating a device for verifying the integrity of executable code according to an embodiment of the present invention. Referring to FIGS. 1 to 9, the operation of verifying the integrity of executable code of the device may be performed as follows.

The main MCU (or MCU) may divide the executable code into multiple blocks at step S310. Here, the sizes of the multiple blocks may be identical to or different from each other. Hash values corresponding to the divided executable code may be calculated, and the calculated hash values may be stored in the hardware security module (HSM) at step S320. Thereafter, when the executable code runs, the HSM compares a hash value corresponding to a portion of the executable code with a hash value stored in the HSM, thus performing the operation of verifying the integrity of the executable code at step S330.

Meanwhile, in an Internet of Things (IoT) environment, in which multiple devices are connected to each other over a network, the multiple devices may act as zombie devices when executable code thereof is damaged due to hacking. Such zombie devices may be used for cyber attacks, such as Distributed Denial of Service (DDoS) attacks, thus putting entire networks in danger. Therefore, in the IoT environment, protection of executable code of devices so that the executable code is not damaged is very important.

The device and method for verifying the integrity of executable code according to embodiments of the present invention may verify the integrity of the executable code of the device using the Hardware Security Module (HSM). In particular, the device and method for verifying the integrity of executable code according to embodiments of the present invention may set integrity values of executable code, which are stored in the hardware security modules for respective devices, to different values even for the same executable code, thus preventing the devices using the same executable code from being simultaneously damaged due to hacking. Thus, the integrity of executable code for each device may be guaranteed. Also, attempts to launch cyber attacks, such as DDoS attacks, using multiple devices, the executable code of which has been damaged, may be fundamentally prevented. Therefore, in an IoT environment, in which the devices are connected to each other, the device and method for verifying the integrity of executable code according to embodiments of the present invention may provide higher security and safety.

An embedded device which performs a specific function according to an embodiment of the present invention may include a main MCU and a hardware security module (security chip) capable of preventing physical hacking in the components of the device.

In an embodiment, the device may divide undamaged executable code having integrity into predetermined portions, may differently set start points and end points of respective portions of the executable code for respective devices, may calculate hash values for the start and end points, and may prestore the calculated hash values in the hardware security module (security chip).

In an embodiment, during a procedure for running the executable code, when, in response to a request from the hardware security module (security chip), the current executable code is divided into predetermined portions and hash values for respective portions are calculated and transmitted to the hardware security module (security chip), the hardware security module (security chip) may perform a procedure for comparing the prestored hash values of the executable code having integrity with the hash value of the current executable code.

In an embodiment, the memory in which the executable code that is the target of integrity verification is stored and running may be either flash memory located inside the main MCU of the device or flash memory located outside the main MCU.

In an embodiment, the method for verifying the integrity of executable code may be configured to, when the integrity of all of the executable code is verified, divide the executable code into predetermined portions, calculate respective hash values for the portions, generate a single value by performing an XOR operation on the calculated hash values, and perform integrity verification based on the single value.

In an embodiment, the method for verifying the integrity of executable code may be configured to, when the integrity of a portion of executable code is verified, perform a procedure for comparing the hash value of the executable code having integrity, stored in the hardware security module, with the hash value of the current executable code, only for one portion of divided executable code.

In an embodiment, the main MCU and the hardware security module (security chip) may be connected to each other using one of standard interfaces (e.g., Universal Asynchronous Receiver-Transmitter (UART), Serial Peripheral Interface (SPI), Secure Digital (SD) card, etc.).

In an embodiment, the process for verifying the integrity of all or part of executable code may also be performed not only during a process of booting the device, but also during the execution of an application service after the booting process.

In an embodiment, during the procedure in which the executable code of the device executes an application service, when the executable code desires to use security functions (encryption, electronic signature, etc.) provided by the hardware security module (security chip), the security functions may be used only when the integrity of the executable code is verified in advance. When it is desired to use the security functions provided by the hardware security module (security chip) without verifying the integrity of the executable code, the hardware security module (security chip) may deny the use of the security functions.

Figure 10:
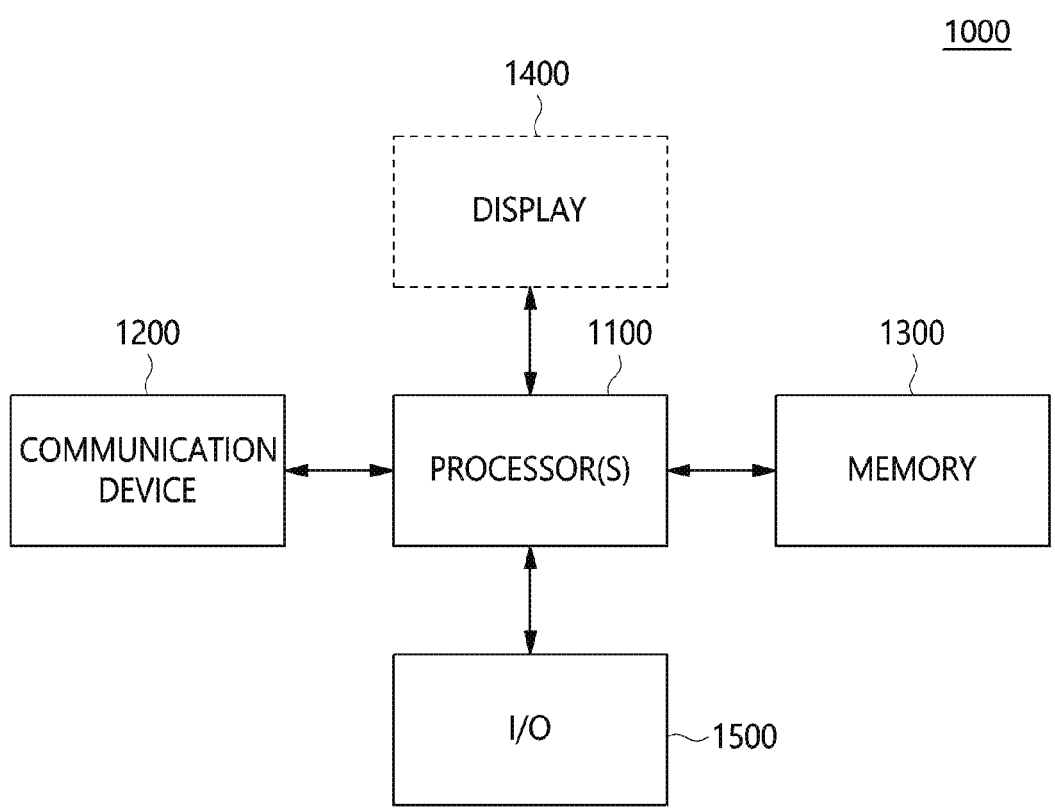
FIG. 10 is a diagram exemplarily illustrating an electronic device according to an embodiment of the present invention.

FIG. 10 is a diagram exemplarily illustrating an electronic device 1000 the according to an embodiment of the present invention. Referring to FIG. 10, the electronic device 1000 may include at least one processor 1100, a network interface (i.e., communication device) 1200, memory 1300, a display 1400, and an input/output device 1500.

The processor 1100 may include at least one device described above with reference to FIGS. 1 to 9, or may be implemented using at least one method described above with reference to FIGS. 1 to 9. The processor 1100 may control a hardware security module (see 320 of FIG. 3) so that the integrity of executable code is verified. Here, the hardware security module may receive hash values corresponding to the executable code divided into multiple blocks from a micro-control unit (MCU) when the device is manufactured, store the hash values corresponding to the divided executable code, receive at least one hash value, among hash values of the multiple blocks, from the MCU when the device boots, and compare the at least one hash value with a hash value corresponding to the at least one hash value, among the stored hash values.

The processor 1100 may execute programs and control the electronic device 1000. The electronic device 1000 may be connected with an external device (e.g., a personal computer or a network) and may exchange data therewith via the input/output (I/O) devices 1500.

The network interface 1200 may be implemented so as to communicate with an external network using any of various wired/wireless methods.

The memory 1300 may store computer-readable instructions. The processor 1100 may perform the above-described operations by executing the instructions stored in the memory 1300. The memory 1300 may be volatile or nonvolatile memory. The memory 1300 may include a storage device for storing user data. The storage device may be an embedded multimedia card (eMMC), a solid-state drive (SSD), universal flash storage (UFS), or the like. The storage device may include at least one nonvolatile memory device. The nonvolatile memory device may be any of NAND flash memory, Vertical NAND (VNAND), NOR flash memory, Resistive Random-Access Memory (RRAM), Phase-Change Memory (PRAM), Magnetoresistive Random-Access Memory (MRAM), Ferroelectric Random-Access Memory (FRAM), Spin-Transfer-Torque Random-Access Memory (STT-RAM), and the like.

The embodiments described above may be implemented through hardware components, software components, and/or combinations thereof. For example, the device, method and components described in the embodiments may be implemented using one or more general-purpose computers or special-purpose computers, for example, a processor, a controller, an arithmetic logic unit (ALU), a digital signal processor, a microcomputer, a field-programmable gate array (FPGA), a programmable logic unit (PLU), a microprocessor, or any other device capable of executing instructions and responding thereto. A processing device may run an operating system (OS) and one or more software applications executed on the OS.

Also, the processing device may access, store, manipulate, process and create data in response to execution of the software. For the convenience of description, the processing device is described as a single device, but those having ordinary skill in the art will understand that the processing device may include multiple processing elements and/or multiple forms of processing elements. For example, the processing device may include multiple processors or a single processor and a single controller. Also, other processing configurations such as parallel processors may be available.

The software may include a computer program, code, instructions, or a combination thereof, and may configure a processing device to be operated as desired, or may independently or collectively instruct the processing device to be operated. The software and/or data may be permanently or temporarily embodied in a specific form of machines, components, physical equipment, virtual equipment, computer storage media or devices, or transmitted signal waves in order to be interpreted by a processing device or to provide instructions or data to the processing device. The software may be distributed across computer systems connected with each other via a network, and may be stored or run in a distributed manner. The software and data may be stored in one or more computer-readable storage media.

The method according to the embodiments may be implemented as program instructions executable by various computer devices, and may be recorded in computer-readable storage media. The computer-readable storage media may individually or collectively include program instructions, data files, data structures, and the like. The program instructions recorded in the media may be specially designed and configured for the embodiment, or may be readily available and well known to computer software experts. Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, and the like, that is, a hardware device specially configured for storing and executing program instructions. Examples of the program instructions include not only machine code made by a compiler but also high-level language code executable by a computer using an interpreter or the like. The above-mentioned hardware device may be configured so as to operate as one or more software modules in order to perform the operations of the embodiment and vice-versa.

The hardware security module for verifying the integrity of executable code, the device having the hardware security module, and the method for operating the device according to embodiments of the present invention may divide the executable code and verify the integrity of the executable code using the hash values corresponding to the divided executable code resulting from the division either during a booting process or if necessary, thus enabling a more secure device operation to be anticipated.

Meanwhile, the above descriptions of the present invention are merely detailed embodiments for practicing the invention. The present invention may include not only a means that can be specifically and actually used, but also a technical spirit, which is an abstract and conceptual idea that can be utilized with technology arising in the future.

What is claimed is:

1. A method for verifying integrity of executable code in a device, comprising:
   dividing, by a Micro-Control Unit (MCU), executable code into multiple blocks;
   generating, by the MCU, hash values corresponding to the blocks resulting from the division;
   storing, by a Hardware Security Module (HSM), the generated hash values;
   calculating, by the MCU, at least one hash value, among hash values of the multiple blocks when the executable code boots; and
   comparing, by the hardware security module, the calculated hash value with a hash value corresponding to the calculated hash value, among the generated hash values corresponding to the blocks stored in the HSM,
   wherein generating the hash values comprises setting start points or end points using a respective first integrity offset value corresponding to each block from a Hardware Security Module (HSM) of the device, at which hash values are to be calculated, for the blocks resulting from the division to different points.

2. The method of claim 1, wherein the blocks resulting from the division have respectively different sizes.

3. The method of claim 1, wherein generating the hash values further comprises adding a first offset value corresponding to each start point or a second offset value corresponding to each end point to a corresponding block of the blocks resulting from the division.

4. The method of claim 3, further comprising:
   generating, by the HSM, the first offset value corresponding to the start point and the second offset value corresponding to the end point using a random number generator; and
   storing, by the HSM, the first and second offset values.

5. The method of claim 3, wherein generating the hash values further comprises:
   in order to generate a hash value of at least one of the blocks resulting from the division, setting a block range to a range from a point, obtained by subtracting the first offset value from a start point of the at least one block, to a point, obtained by adding the second offset value to an end point of the at least one block.

6. The method of claim 5, wherein a block range of a first block, among the blocks resulting from the division, ranges from a start point of the first block to a point obtained by adding the second offset value to an end point of the first block.

7. The method of claim 5, wherein a block range of a last block, among the multiple blocks resulting from the division, ranges from a point, obtained by subtracting the first offset value from a start point of the last block, to an end point of the last block.

8. The method of claim 1, wherein the generated hash values are stored in the HSM when the device is manufactured.

9. The method of claim 1, wherein the HSM verifies integrity of all blocks resulting from the division.

10. The method of claim 1, wherein the HSM verifies integrity of any one of the blocks resulting from the division.

11. The method of claim 10, further comprising randomly generating a block number corresponding to the one block.

12. The method of claim 10, wherein an operation of verifying the integrity of the one block is performed when the MCU invokes a security function provided by the HSM.

13. A hardware security module for verifying integrity of executable code, comprising:
   at least one processor; and
   a memory for storing at least one instruction that is executed by the at least one processor,
   wherein the at least one instruction is executed by the at least one processor so as to:
   when a device is manufactured, receive hash values corresponding to executable code divided into multiple blocks from a Micro-Control Unit (MCU),
   store the hash values corresponding to the divided executable code, receive at least one hash value, among hash values of the multiple blocks, from the MCU when the device boots; and compare the at least one hash value with a hash value corresponding to the at least one hash value, among the stored generated hash values corresponding to the blocks, wherein the hash values are generated, by the MCU, based on setting start points or end points using a respective first integrity offset value corresponding to each block from a Hardware Security Module (HSM) of the device, at which hash values are to be calculated, for the blocks resulting from the division to different points.

14. The hardware security module of claim 13, wherein, when the device boots, integrity of all of the multiple blocks is verified.

15. The hardware security module of claim 13, wherein, when a security function invocation is received from the MCU, integrity of any one of the multiple blocks is verified.

16. The hardware security module of claim 15, further comprising a random number generator for generating a block number corresponding to any one of the multiple blocks.

17. The hardware security module of claim 13, wherein block ranges for respectively verifying integrity of the multiple blocks are set differently depending on devices.

18. A device for verifying integrity of executable code, comprising:
 a micro-control unit (MCU) for dividing the executable code into multiple blocks when the device is manufactured and generating hash values corresponding to the multiple blocks resulting from the division; and
 a hardware security module for storing the generated hash values when the device is manufactured, receiving at least one hash value, among hash values of the multiple blocks from the MCU when the executable code boots, comparing the received hash value with a hash value corresponding to the received hash value, among the stored generated hash values corresponding to the blocks, and verifying integrity of the executable code based on a result of the comparison,
 wherein the hash values are generated, by the MCU, based on setting start points or end points using a respective first integrity offset value corresponding to each block from a Hardware Security Module (HSM) of the device, at which hash values are to be calculated, for the blocks resulting from the division to different points.

19. The device of claim 18, wherein the block ranges of the multiple blocks are set differently for respective devices using at least one offset value generated by a random number generator of the hardware security module.

* * * * *